United States Patent [19]

Gordon et al.

[11] 4,157,218

[45] Jun. 5, 1979

[54] WIDE ANGLE SCAN CAMERA

[75] Inventors: Robert Gordon, Norwalk; Gerard E. Boyan, Redding, both of Conn.

[73] Assignee: The Perkin-Elmer Corporation, Norwalk, Conn.

[21] Appl. No.: 787,530

[22] Filed: Apr. 14, 1977

[51] Int. Cl.$^2$ .................. G03B 39/00; G03B 37/00
[52] U.S. Cl. ................................ 354/66; 354/94
[58] Field of Search ............... 355/1; 352/69; 354/65–69, 94–96, 71, 99

[56] References Cited

U.S. PATENT DOCUMENTS

| | | | |
|---|---|---|---|
| 2,969,005 | 1/1961 | Blackstone | 354/69 |
| 3,653,307 | 4/1972 | De Heere et al. | 354/65 |
| 3,821,763 | 6/1974 | Scott | 354/94 |
| 3,934,259 | 1/1976 | Krider | 354/94 |
| 4,033,687 | 7/1977 | Hirayama et al. | 355/1 |

FOREIGN PATENT DOCUMENTS

| | | | |
|---|---|---|---|
| 2277358 | 1/1976 | France | 354/94 |
| 733810 | 7/1955 | United Kingdom | 354/71 |

*Primary Examiner*—Donald A. Griffin

*Attorney, Agent, or Firm*—Salvatore A. Giarratana; Francis L. Masselle; Edwin T. Grimes

[57] ABSTRACT

A wide angle strip camera system which, in combination, includes a wide angle lens, having a curved conjugate focal surface, an image-receiving surface, a curved exposure slit disposed adjacent the image-receiving surface; the lens, image-receiving surface and exposure slit being so mounted that a semicircular strip at a constant preselected field angle in an object field is focused on the image-receiving surface. The system is fixedly supported in a vehicle, such as an aircraft, whereby the forward velocity of the vehicle provides image motion. The exposure slit is curved to correspond to field points of equal range so that there is negligible differential image motion within the slit, the slit being of such width in the direction of vehicle motion to result in uniform exposure; and the image-receiving surface is driven in the direction of vehicle movement at a speed corresponding to the altitude-velocity ratio of the vehicle with respect to the object field.

In a preferred form of the invention, the wide angle lens is a globe lens.

3 Claims, 8 Drawing Figures

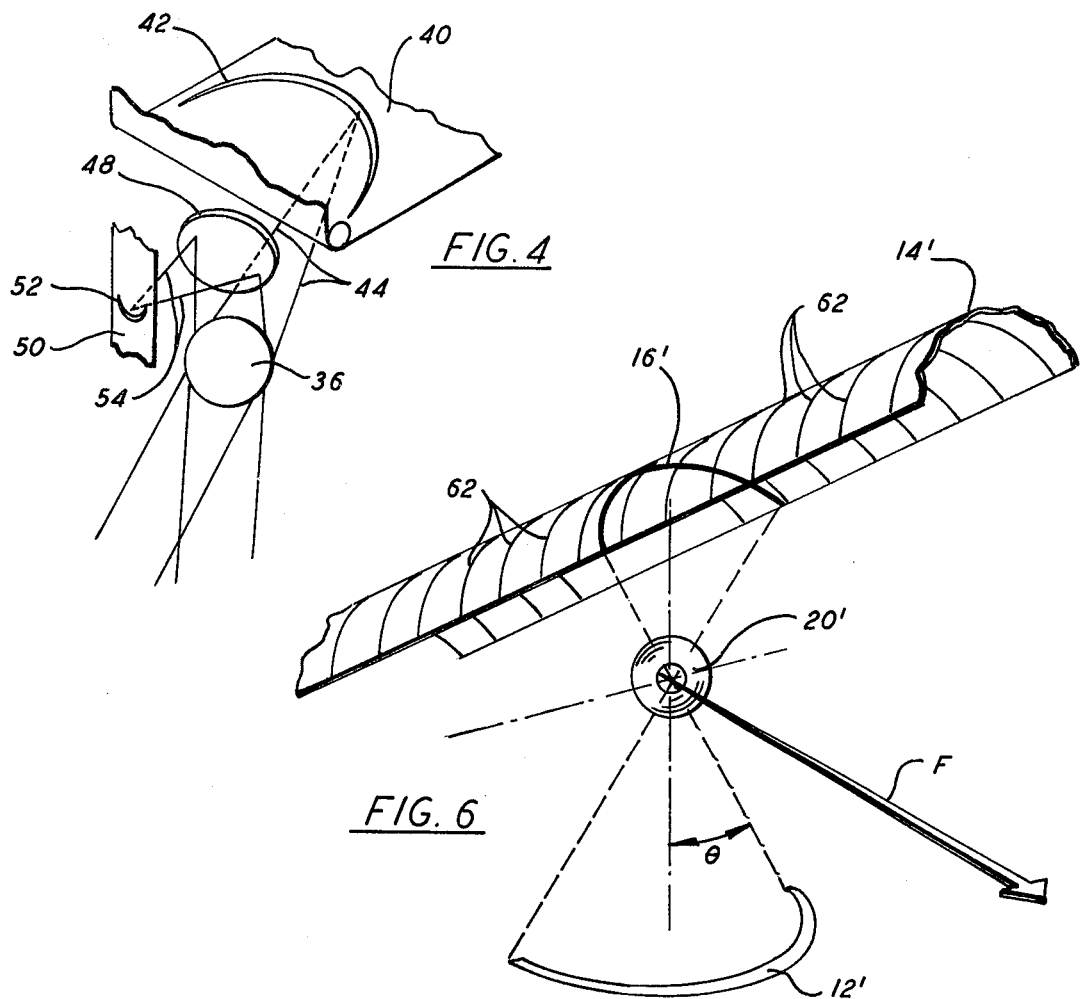
FIG. 4
FIG. 6
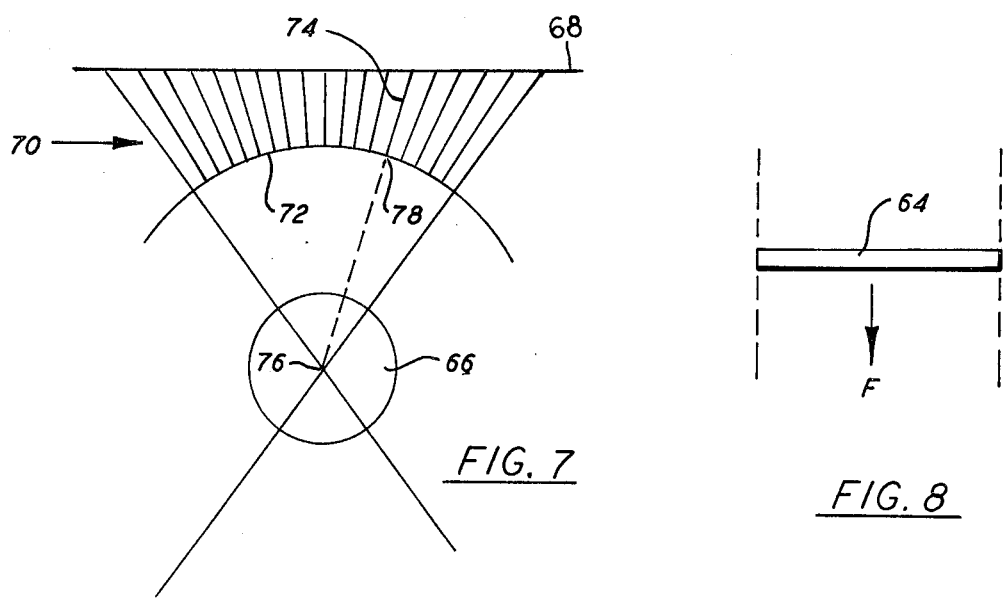
FIG. 7
FIG. 8

WIDE ANGLE SCAN CAMERA

BACKGROUND OF THE INVENTION

This invention relates to photography, and more particularly, to a new continuous film feed type of camera. Cameras constructed in accordance with the concepts of this invention are particularly adapted, among other possible uses, for use in an aircraft or space vehicle for taking wide angle scan photographs.

As understood in the photographic art, a strip camera is a continuous film feed type which produces a photographic record in the fore-to-aft mode, i.e., along the path of the aircraft in which the camera is mounted. However, heretofore, the use of this type of camera was limited to relatively narrow field angles, and hence, panoramic type cameras became popular. A panoramic camera is one in which the optical axis sweeps or scans the view to be photographed particularly in a transverse mode, i.e., at right angles to the direction of movement of the vehicle on which it is mounted. However, such panoramic cameras are not entirely satisfactory due to their inherent mechanical complexity, required to effect the scanning motion.

A related patent in this field is the Scott U.S. Pat. No. 3,821,763, which is assigned to the same Assignee as the present application. This patent describes an image-forming optical system which includes elements arranged rotationally symmetric about an axis. The system is optically corrected to produce adequate imagery in an annular zone centered on the axis with all points in the zone possessing field angles other than zero, and at least one image surface conforms substantially to at least a part of the zone. Aperture limiting means are provided to define at a conjugate focal surface an area whose points possess field angles corresponding to the field angles of points in the zone. The aperture limiting means is positioned to define an object field area imaged on the image surface, and means are provided to scan the object field area with respect to the system.

SUMMARY OF THE INVENTION

In order to accomplish the desired results, this invention provides in one form thereof a new and improved wide angle strip camera system which, in combination, is characterized by a wide angle lens, having a curved conjugate focal surface, an image-receiving surface, and a curved or crescent-shaped exposure slit disposed adjacent the image-receiving surface. The lens, image-receiving surface and exposure slit are so mounted that a semicircular strip at a constant preselected field angle in an object field is focused on the image-receiving surface, said lens may be optically optimized for said field angle. The system is fixedly supported in a vehicle such as an aircraft, for example, so that the forward velocity of the vehicle provides the image motion. The exposure slit is curved to correspond to field points of equal range so that there is negligible differential image motion within the slit, and the slit is of constant width in the direction of vehicle motion. The image-receiving surface is driven in the direction of vehicle movement at a speed corresponding to the altitude-velocity ratio of the vehicle with respect to the object field.

In a preferred form of the invention, the wide angle lens is a globe lens, and when the system is employed in an aerial reconnaissance aircraft the globe lens can also serve as an interface between the aircraft and the external environment. According to one aspect, the image-receiving surface is substantially flat and "slices" through the spherical focal surface of the globe lens at a height corresponding to the desired look or field angle, and according to another aspect the image-receiving surface is curved to substantially closely match the contour of the conjugate focal plane of the globe lens.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which the disclosure is based may readily be utilized as a basis for the designing of other systems for carrying out the several purposes of the invention. It is important, therefore, that the claims be regarded as including such equivalent systems as do not depart from the spirit and scope of the invention.

Specific embodiments of the invention have been chosen for purposes of illustration and description, and are shown in the accompanying drawings, forming a part of the specification.

BRIEF DESCRIPTION OF THE DRAWINGS

FIG. 4 is a perspective view of a dual-field globe lens strip camera system according to another embodiment;

FIG. 6 is a perspective view of a wide angle strip camera system according to still another embodiment;

FIG. 7 is a schematic representation of still another embodiment of a wide angle strip camera system; and FIG. 8 is a schematic illustration of the field coverage of the camera system of FIG. 7.

DESCRIPTION OF THE PREFERRED EMBODIMENTS

Figure 1:
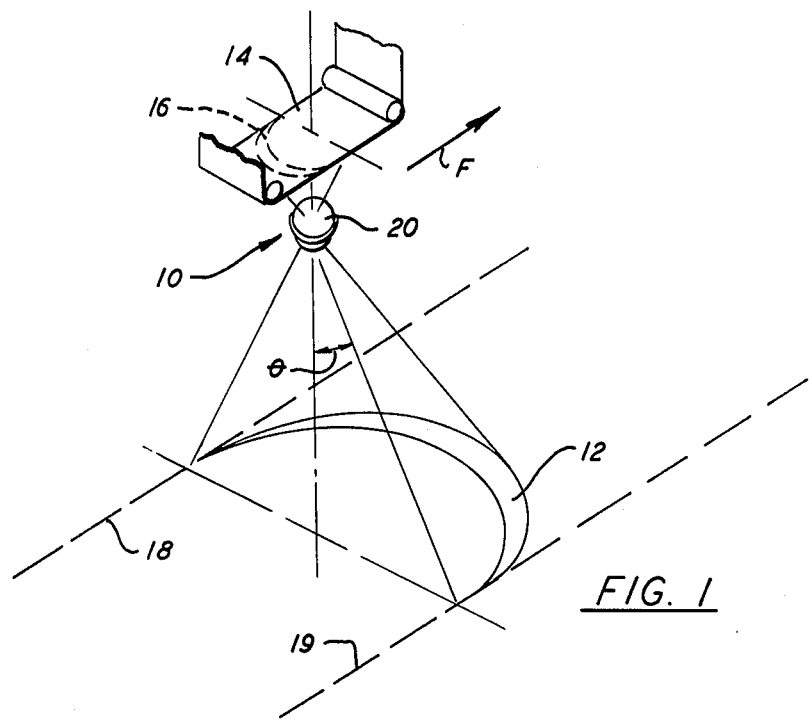
FIG. 1 is a perspective view of a wide angle strip camera system embodying the present invention.
Figure 2:
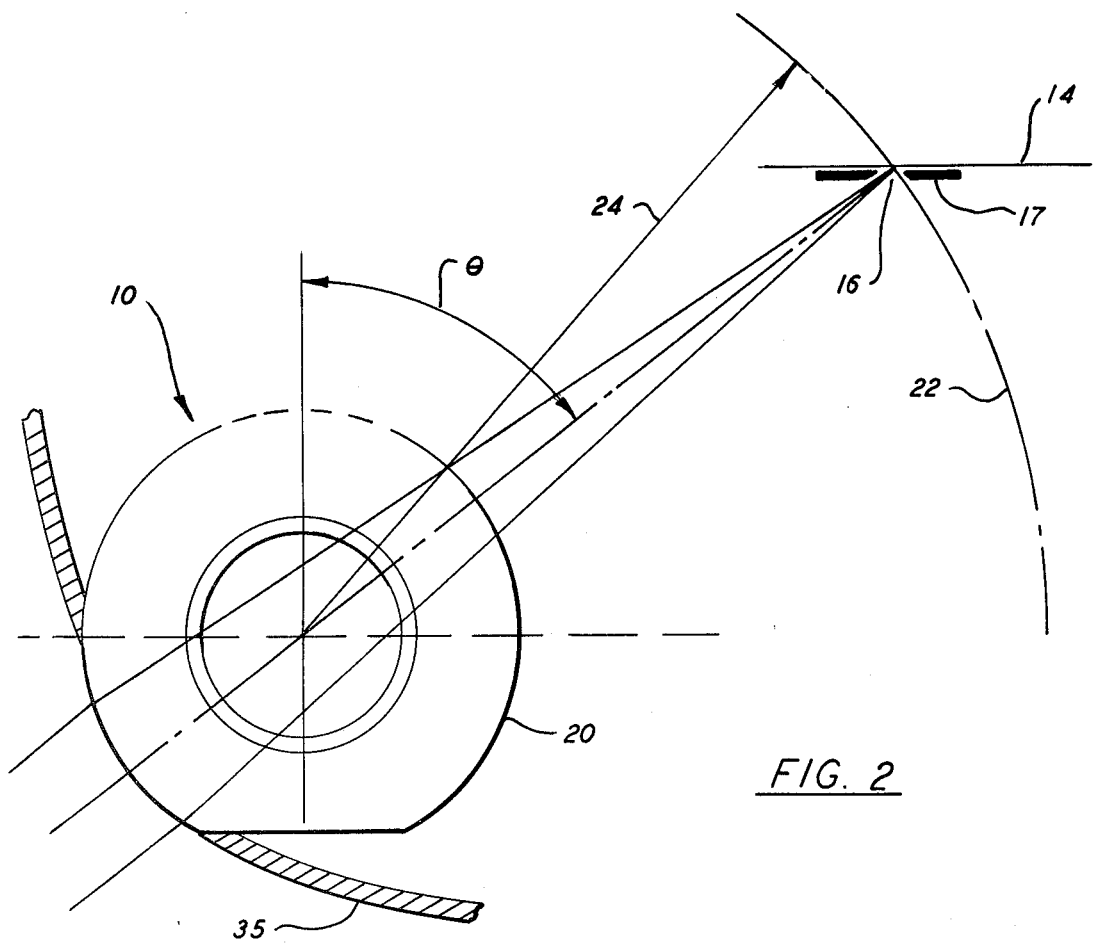
FIG. 2 is an enlarged fragmentary schematic illustration of the embodiment of FIG. 1.
Figure 3:
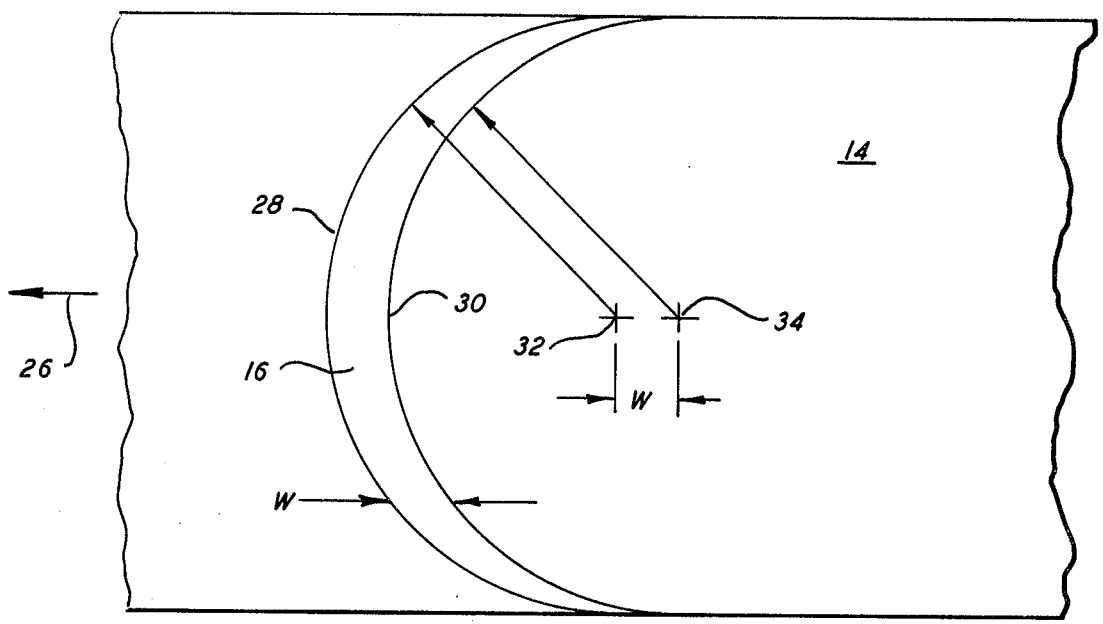
FIG. 3 is an enlarged view of the crescent-shaped exposure slit and image-receiving surface of the embodiment of FIG. 1.

In the embodiment of the invention illustrated in FIGS. 1 to 3, a wide angle strip camera comprises a lens system, indicated generally at 10, which is fixedly supported in a vehicle or aircraft, not shown, having a direction of flight indicated by the arrow F. The forward velocity of the aircraft provides the image motion as in an ordinary strip camera. An approximately semi-circular strip 12 on the ground is imaged on an image-receiving surface such as a photographic film 14 through a semicircular or crescent-shaped exposure slit 16 in a mask 17 disposed adjacent the film as seen in FIG. 2. The recorded image is a continuous oblique view of the terrain, and the perspective corresponds to the semi-field angle $\theta$. Thus, the photographs provide an oblique perspective of objects, and maps rectangles on the ground as rectangles on the film. The exposure slit is curved to correspond to ground points of equal range so that there is negligible differential image motion within the slit. That is, all points at the same range have the same image motion, which can be exactly compensated for by normal film motion. As will be discussed more fully hereinafter, the system is designed to optimize a given field position, with respect to differential image motion, and not have to compromise this design to accommodate many field positions. The semi-field angle $\theta$ may, for example, be selected as about 70 degrees, which presents an image of a 140 degree swath of ground coverage, as indicated between the broken lines 18 and 19 in FIG. 1. Thus, an aircraft permits exposure of the film at any instant of time to the image of an arcuate area on the ground whose width may be hundreds or thousands of feet wide so that in a short time with the aircraft flying, there may be recorded an area of many square miles.

In the system according to the invention, the film only is moved, as compared to conventional panoramic systems in which an optical scan is required. The film is driven in the direction of flight at a speed which, in substance, is the speed of the aircraft over the ground multiplied into the ratio of image distance to object distance for the lens system. This ratio is the ratio of the optical distance between the film 14 and the lens system 10 to the altitude of the aircraft, or more exactly to the distance from the aircraft to that area on the ground whose image in the lens system passes through the slit to reach the film.

The lens system 10 is one which gives satisfactory image quality at a large enough off-axis angle. A suitable system is described in the aforementioned Scott U.S. Pat. No. 3,821,763. This patent describes a system which is optimized for a single off-axis angle. That is, the lens employs a selected portion of the lens field of view, and because only an annular portion of the field is used, the optical design is optimized for this area without the need for maintaining high performance in either the axial region or at other field positions. However, it has been found that a globe lens, as indicated at 20 in the drawings, has significant advantages for the lens system of this invention. Because every point in the field is equally well corrected, the field angle used may be arbitrarily selected to optimally match the perspective to the nature of the terrain that is of interest. It will be appreciated that a globe lens is a monocentric lens form composed of concentric spheres, or spherical segments, with the advantage of having no preferred light direction, i.e., every field position is on-axis. Thus, it will be appreciated that a globe lens has an extremely wide field, and yet the image motion associated with this lens is avoided by photographing at a constant preselected field angle. The image quality remains essentially uniform throughout the field of view. The focal plane 22 is spherically curved, concave toward the lens, the focal length being indicated by arrow 24 in FIG. 2. It will be appreciated that the film plane 14 "slices" through the spherical focal plane 22 at a height equivalent to the desired "look" or semi-field angle $\theta$. That is, the curved slit in the focal surface selects the field angle covered. Of course, it would be desirable to have an infinitely narrow slit and an infinitely bright image for ideal performance. However, at the usual operational illumination levels, the depth of focus of the system is within the slit width requirements for exposure. Because the film plane is maintained flat, an additional cosine illumination loss occurs, but as a practical matter, the illumination levels are satisfactory.

Because of the fixed preselected field angle $\theta$, the illumination along the slit is a constant, thereby permitting a fixed width in the direction of film motion. In some installations, the stop arrangement in the globe lens may prevent the illumination along the slit from being constant, thereby requiring slit variation to control exposure. As best seen in FIG. 3, to maintain a constant slit width W in the film 14 motion direction, as indicated by arrow 26, and consequently maintain constant exposure, the curvature of the leading edge 28 and trailing edge 30 of the slit is identical but the centers of curvature 32 and 34, respectively, are displaced a distance W equal to the desired slit width.

It will be appreciated that in some aerial reconnaissance applications where hemispheric or hyperhemispheric windows are conventionally employed, the globe lens 20 per se may serve as the interface between the aircraft, as indicated at 35 in FIG. 2, and the external environment. This totally eliminates the need for large, frequently segmented windows that are commonly used with scanning cameras, and results in savings of camera bay space.

Figure 5:
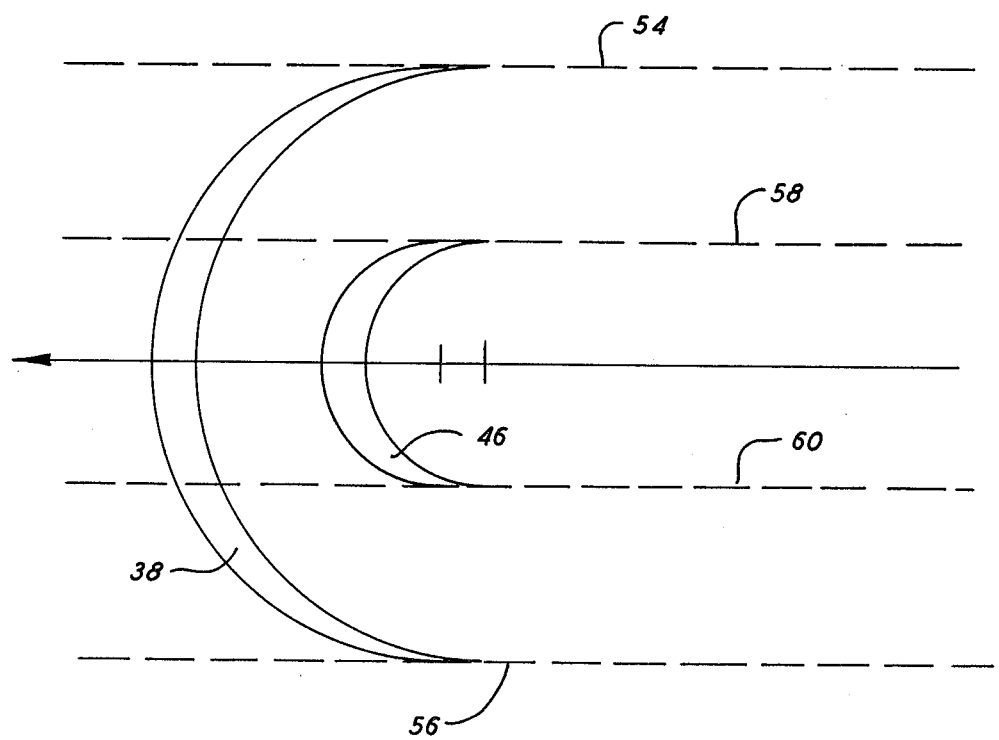
FIG. 5 is a schematic illustration of the field coverage of the camera system of FIG. 4.

It will be appreciated that in some installations, it is desirable to supplement the wide field ground coverage of the camera system described hereinbefore in connection with the embodiment of FIGS. 1 to 3. The embodiment of FIGS. 4 and 5 is directed to a dual-field globe lens strip camera, which includes wide field coverage supplemented by a narrow field with a less oblique perspective. This dual-field globe lens strip camera includes a globe lens 36 which may, for example, be the same as the globe lens 20 described hereinbefore in connection with the embodiment of FIGS. 1 to 3. A semicircular strip 38, FIG. 5, on the ground is imaged by means of the globe lens 36 on a first photographic film 40, FIG. 4, through a first semicircular exposure slit 42 in a mask (not shown) disposed adjacent the film, the light bundle for points far from nadir being indicated at 44. As in the embodiment of FIGS. 1 to 3, the exposure slit is of constant width in the direction of flight and is curved to correspond to ground points of equal range so that there is no differential image motion within the slit. The film plane 40 "slices" through the spherical focal plane at a height equivalent to the desired semi-field angle that may, for example, be selected as about 70 degrees, which presents an image of a 140 degree swath of ground coverage.

In addition, in the embodiment of FIGS. 4 and 5, a second semicircular strip 46, FIG. 5, on the ground is imaged by means of the globe lens 36, FIG. 4, via a fold flat or folding mirror 48 on a second photographic film 50, through a second semicircular exposure slit 52 in a mask (not shown) disposed adjacent the film, the light bundle for these points which are relatively near the nadir being indicated at 54. It will be appreciated that the exposure slit 52 is of constant width in the direction of movement and is also curved to correspond to ground points of equal range so that there is no differential image motion within the slit. The film plane 50 "slices" through the spherical focal plane of the globe lens at a height equivalent to the desired semi-field angle that may, for example, be selected as about 20 degrees, which presents an image of a 40 degree swath of ground coverage. It is noted that the folding mirror 48 is so positioned that it does not interfere with the light bundle 44 directed to the first photographic film 40.

In operation, the first film 40 contains the recorded image of all terrain within the wide angle field of view as seen from the oblique perspective corresponding to the semi-field angle of 70 degrees, as shown between the broken lines 54 and 56 in FIG. 5, with the direction of flight being indicated at F. The second film 50 contains the recorded image of the central portion of this scene enlarged and with a less oblique perspective, as shown between the broken lines 58 and 60 in FIG. 5. Both the first and the second films are driven at rates proportional to the velocity to height ratio of the airplane by the same drive mechanism.

As indicated hereinbefore in connection with the embodiments of FIGS. 1 to 5, the flat film surface cuts across the spherical image surface so that the depth of focus represents a potential performance limitation depending upon the actual lens employed. While in actual practice, the slit width can be made narrow enough to greatly reduce this effect. FIG. 6 shows an alternate embodiment wherein the film is curved to closely match the contour of the conjugate spherical focal surface. That is, the strip camera includes a globe lens 20' to image a semicircular strip 12' on the ground on a photographic film 14' through a semicircular exposure slit 16' in a mask (not shown) adjacent the film. The film is curved to closely match the contour of the conjugate spherical focal surface by means of air bars indicated at 62 in FIG. 6. As in the embodiment of FIGS. 1 to 5, the film is driven in the direction of flight at a rate proportional to the velocity to height ratio of the airplane by a suitable drive mechanism.

Referring next to FIGS. 7 and 8, another embodiment of the invention is illustrated wherein image motion compensation is effected by converting the curved focal surface associated with a cross track lens coverage to a flat plane of equal photographic scale with no differential motion across the format. In this embodiment, a rectangular strip 64, FIG. 8, on the ground is imaged by means of a wide-angle or globe lens 66, FIG. 7, on an image-receiving surface or photographic film 68, through an optical fiber bundle, indicated generally at 70. The forward velocity of the aircraft, in the direction as indicated by the arrow F in FIG. 8, provides the image motion, as in an ordinary strip camera. The fiber bundle 70 matches a spherical or cylindrical focal surface 72 to the flat film surface 68 and provides the image scale that would have been achieved by an ideal wide-angle lens. This is effected by arranging each fiber, one being indicated at 74, on a straight line extending through the lens nodal point 76 and the image focal point 78. As a result, the fiber centers are further apart in the film plane 68 than in the focal surface 72. The fiber bundle in effect resembles the spikes of a porcupine with a crew cut. This separation is not necessary in the track or flight direction as the picture distortion is negligible and it would unduly complicate the fabrication of the fiber optics. It will be appreciated that the optical system of this embodiment is particularly suitable as one element of a dual camera arrangement, such as the arrangement illustrated in FIG. 4. That is, the scene camera arrangement of this embodiment could be substituted for the second narrower range photography on the second film of the embodiment shown in FIG. 4. The advantage of this combination is that the system of FIGS. 7 and 8 can be pointed straight down at zero field angle or on nadir, while the second camera system views the scene from an oblique angle, whereby objects are in effect viewed from two different directions or angles.

It will thus be seen that the present invention does indeed provide a new and improved wide angle strip camera system, which provides image motion compensation in the fore-to-aft mode, wherein the entire object field of view is "on axis", which reduces image redundancy, and which is superior in simplicity, operability and reliability as compared to prior systems. Having thus described the invention with particular reference to the preferred forms thereof, it will be obvious to those skilled in the art to which the invention pertains, after understanding the invention that various changes and modifications may be made therein without departing from the spirit and scope of the invention, as defined by the claims appended hereto.

We claim:

1. A wide angle strip camera system which, in combination, comprises:
   globe lens means:
   an image-receiving surface;
   curved exposure slit means disposed adjacent said image-receiving surface;
   said lens means, image-receiving surface and exposure slit means being so mounted that a curved strip at a constant preselected field angle in an object field is focused on the image-receiving surface;
   said system being fixedly supported in a vehicle whereby the forward velocity of the vehicle provides image motion;
   said exposure slit means being curved to correspond to field points of equal range so that there is substantially no differential image motion within the slit;
   means for moving said image-receiving surface in the direction of vehicle movement at a speed corresponding to the altitude-velocity ratio of the vehicle with respect to the object field; and
   said vehicle being an aerial reconnaissance aircraft and said globe lens per se being an interface between the aircraft and the external environment.

2. A wide angle strip camera system which, in combination, comprises:
   globe lens means;
   an image-receiving surface;
   curved exposure slit means disposed adjacent said image-receiving surface;
   said lens means, image-receiving surface and exposure slit means being so mounted that a curved strip at a constant preselected field angle in an object field is focused on the image-receiving surface;
   said system being fixedly supported in a vehicle whereby the forward velocity of the vehicle provides image motion;
   said exposure slit means being curved to correspond to field points of equal range so that there is substantially no differential image motion within the slit;
   means for moving said image-receiving surface in the direction of vehicle movement at a speed corresponding to the altitude-velocity ratio of the vehicle with respect to the object field;
   said image-receiving surface being curved to substantially closely match the contour of the spherical focal surface of said globe lens; and air bar means for curving said image-receiving surface.

3. A dual-field globe lens strip camera system which, in combination, comprises:
   globe lens means;
   a first image-receiving surface;
   semicircular exposure slit means disposed adjacent said first image-receiving surface;
   said lens means, first image-receiving surface and exposure slit means being so mounted that a semicircular strip at a constant preselected field angle in an object field is focused on the first image-receiving surface;

said globe lens means having a curved second conjugate focal surface;

fold flat means being interposed between said globe lens means and said curved second conjugate focal surface;

a substantially flat second image-receiving surface;

an optical fiber bundle interposed between said curved conjugate focal surface and said flat image receiving surface;

said lens means, fold flat means, second image-receiving surface and optical fiber bundle being so mounted that a strip in the object field is focused on the second image-receiving surface;

said system being fixedly supported in a vehicle whereby the forward velocity of the vehicle provides image motion;

said exposure slit means being curved to correspond to field points of equal range so that there is substantially no differential image motion within the slit;

the elements in said optical fiber bundle being arranged to compensate on the second image-receiving surface for differential image motion corresponding to field points on said strip in the object field; and means for moving said image-receiving surfaces in the direction of vehicle movement at speeds corresponding to the altitude-velocity ratio of the vehicle with respect to the object field.

* * * * *